(12) United States Patent
Eckroth

(10) Patent No.: US 8,511,588 B1
(45) Date of Patent: Aug. 20, 2013

(54) SMALL-SCALE SPREADER DEVICE

(76) Inventor: Benjamin D. Eckroth, Millville, PA (US)

( * ) Notice: Subject to any disclaimer, the term of this patent is extended or adjusted under 35 U.S.C. 154(b) by 536 days.

(21) Appl. No.: 12/855,264

(22) Filed: Aug. 12, 2010

(51) Int. Cl.
*A01C 19/00* (2006.01)
*A01C 17/00* (2006.01)
*E01C 19/20* (2006.01)

(52) U.S. Cl.
USPC .......... 239/673; 239/672; 239/674; 239/676; 239/681; 239/682; 239/685

(58) Field of Classification Search
USPC ............... 239/289, 661, 663, 670, 672, 673, 239/674, 676, 681, 682, 684, 685
See application file for complete search history.

(56) References Cited

U.S. PATENT DOCUMENTS

| | | | |
|---|---|---|---|
| 3,232,626 A * | 2/1966 | Polzin | 239/665 |
| 3,523,648 A | 8/1970 | Garber | |
| 3,951,312 A * | 4/1976 | Gay | 222/616 |
| 4,106,703 A * | 8/1978 | Magda | 239/656 |
| 4,283,014 A * | 8/1981 | Devorak | 239/677 |
| 5,180,112 A * | 1/1993 | Hoyle | 239/685 |
| 5,340,033 A | 8/1994 | Whitell | |
| 5,533,676 A | 7/1996 | Conley | |
| D413,904 S | 9/1999 | Spear | |
| 6,905,077 B2 * | 6/2005 | Hoyle | 239/7 |
| 6,907,832 B2 | 6/2005 | Wyne | |
| 7,040,556 B2 | 5/2006 | Jones | |

* cited by examiner

*Primary Examiner* — Ryan Reis

(57) ABSTRACT

A ground-driven spreader device featuring a frame with two wheels each enaged in a portion of a split axle; a hopper disposed atop the frame; a belt drive disposed on the frame with a cleated belt, the belt drive is operatively connected to the first axle of the first wheel wherein the belt drive causes the cleated belt to rotate causing material having fallen from the hopper to be propelled forwardly; a pair of spinner heads disposed in the frame; and a spinner head drive disposed on the frame, the spinner head drive is operatively connected to the second axle of the second wheel, the spinner head drive functions to cause the pair of spinner heads to propel material from the device.

3 Claims, 6 Drawing Sheets

SMALL-SCALE SPREADER DEVICE

FIELD OF THE INVENTION

The present invention is directed to spreading devices such as spreaders and hoppers, more particularly to a small-scale spreader device capable of spreading moist and/or dry granular material.

BACKGROUND OF THE INVENTION

The currently available spreaders with the capability of spreading moist or dry material are generally limited to large-scale devices for commercial purposes. The present invention features a small-scale spreader device for spreading such material. The unique design of the present invention allows for a smaller unit to be produced. Without wishing to limit the present invention to any theory or mechanism, it is believed that the present invention is small and simplistic in design, easy to use, robust, and versatile.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a ground-driven spreader device. In some embodiments, the device comprises a split axle divided into a first axle and a second axle, the first axle engages a first wheel and the second axle engages a second wheel; a frame mounted atop the split axle, wherein handles are removably attached to a front end of the frame and a trailer hitch is removably attached to a back end of the frame opposite the handles, the handles function to help a user manually push the spreader device forwardly, the trailer hitch is adapted to engage a standard tongue component of a tractor; a hopper disposed atop the frame, the hopper comprises an adjustable material gate for controlling release of material from the hopper into the frame; a belt drive disposed on a side of the frame underneath the hopper, wherein a cleated belt rotates over the belt drive, the belt drive is operatively connected to the first axle of the first wheel wherein rotation of the first wheel activates the belt drive and causes the cleated belt to propel in a forward direction causing material having fallen from the material gate of the hopper atop the cleated belt to be propelled forwardly toward and through a metering gate disposed in the frame; a pair of spinner heads disposed in the back end of the frame; and a spinner head drive disposed on a side of the frame opposite the belt drive, the spinner head drive is operatively connected to the second axle of the second wheel, the spinner head drive functions to drive the pair of spinner heads causing the pair of spinner heads to help propel and disperse material from the device, wherein when the second wheel rotates, the material from the cleated belt is pushed to the pair of spinner heads which are rotated via the spinner head drive, the pair of spinner heads disperse the material below the device.

DESCRIPTION OF PREFERRED EMBODIMENTS

Referring now to FIG. 1-5, the present invention features a ground-driven small-scale spreader device 100 for spreading wet and/or dry granular material. The spreader device 100 can be manually pushed or alternatively pulled by a vehicle such as a tractor.

Figure 1:
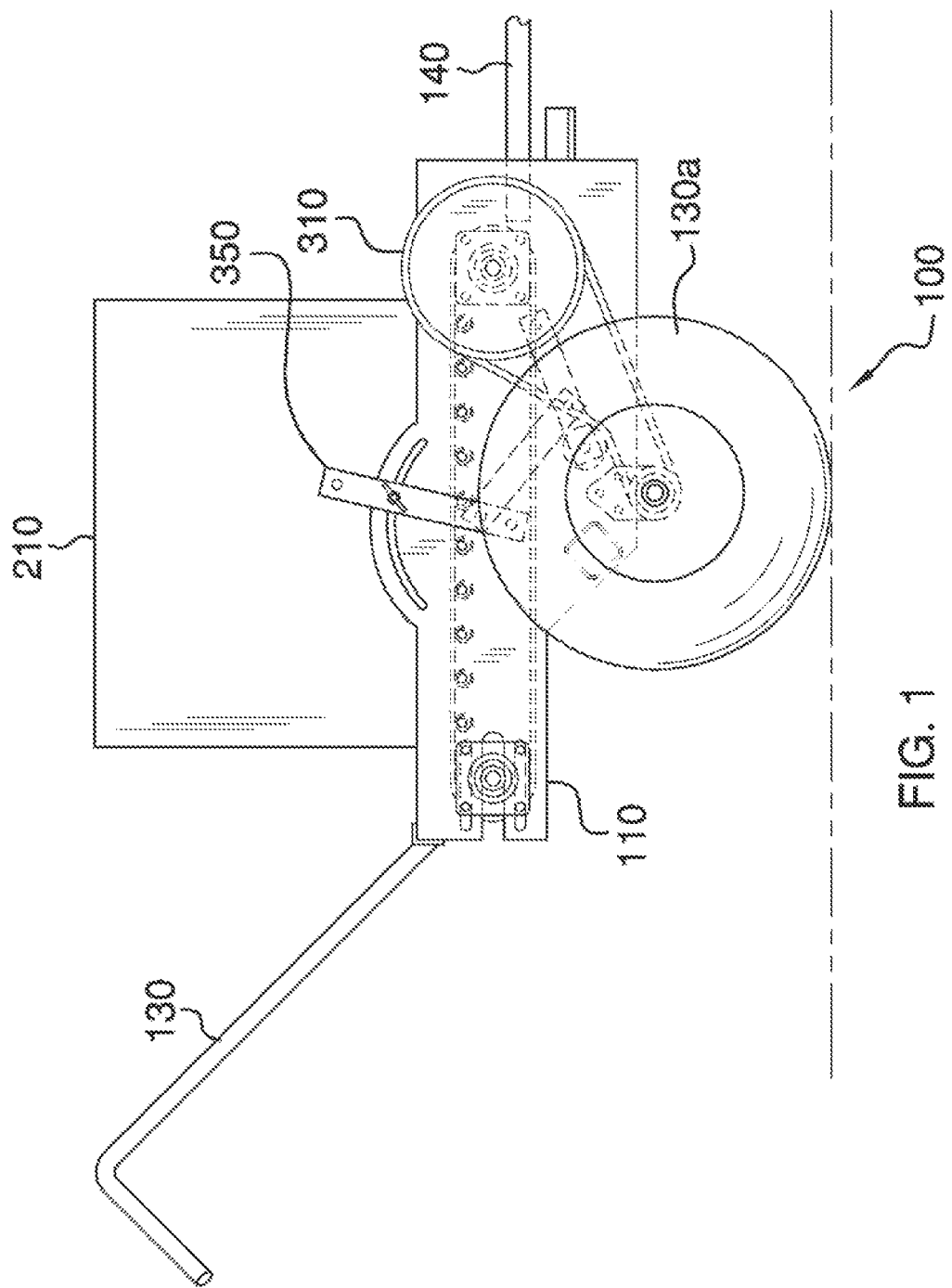
FIG. 1 is a first side and internal view of the spreader device of the present invention.

The spreader device 100 of the present invention comprises a frame 110 situated atop a split axle 132a, 132b with a first wheel 130a and a second wheel 130b (e.g., studded tires, rubber wheels, etc.). The first axle 132a engages the first wheel 130a and the second axle 132b engages the second wheel 130b. The first axle 132a and second axle 132b are joined in a split axle bearing housing 133 (which allows the device to make corners without wheel hop). Handles 130 are removably attached (e.g., pivotally attached) to a front end of the frame 110. As shown in FIG. 1, the handles 130 extend outwardly from the frame 110. The handles 130 may be used when the device 100 is propelled forward manually, for example (e.g., a user pushes the device 100 like a standard spreader). In some embodiments, a trailer hitch 140 is (e.g., pivotally, removably) attached to a back end of the frame 110 (opposite the handles 130). The trailer hitch 140 is adapted to engage the tongue (or equivalent) component of the tractor. A user may wish to remove the handles 130 when pulling the device 100 from behind a tractor, for example.

Disposed atop the frame 110 is a hopper 210 for holding the granular material. Hoppers are well known to one of ordinary skill in the art. The hopper 210 comprises an adjustable material gate 220 for controlling material release from the hopper 210 into the frame 110 (and components therein, for example the cleated belt 320).

Figure 1A:
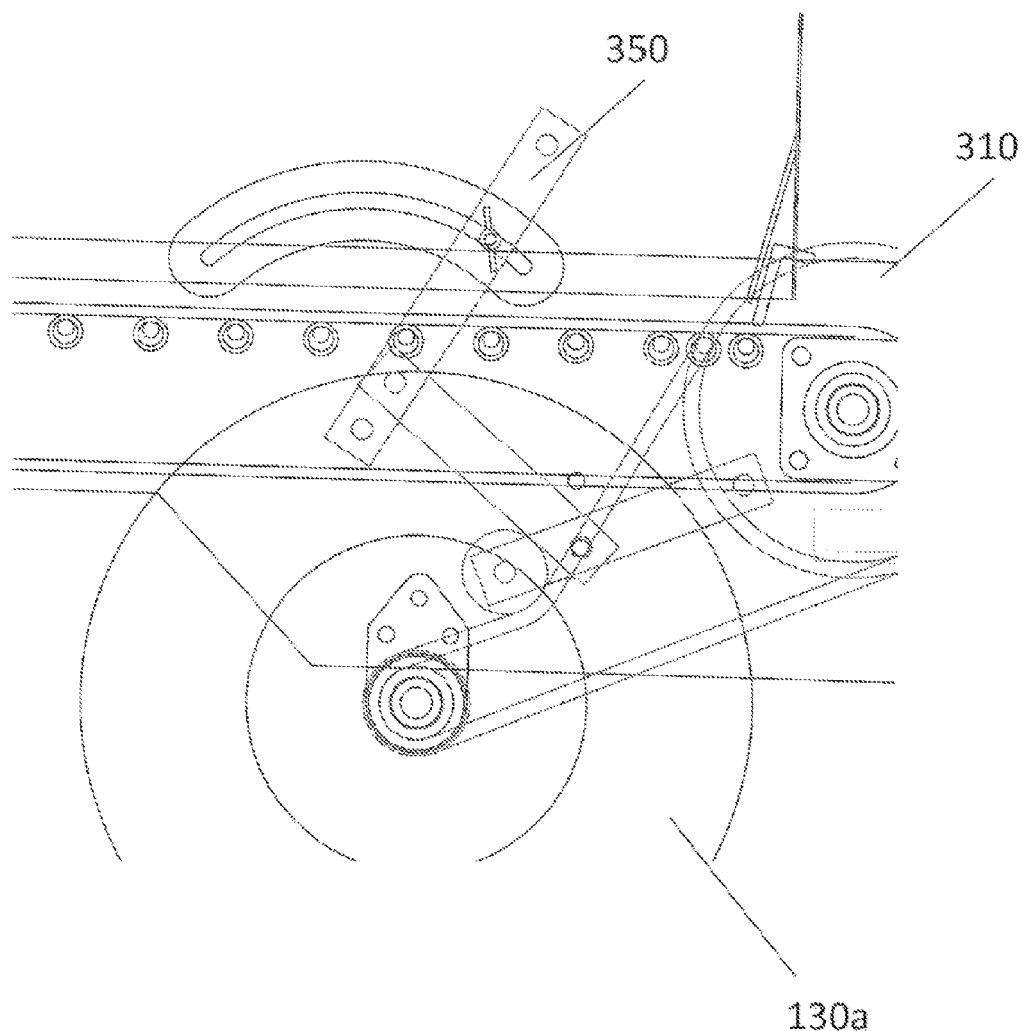
FIG. 1A is an exploded view of the clutch assembly of the spreader device of FIG. 1.
Figure 3:
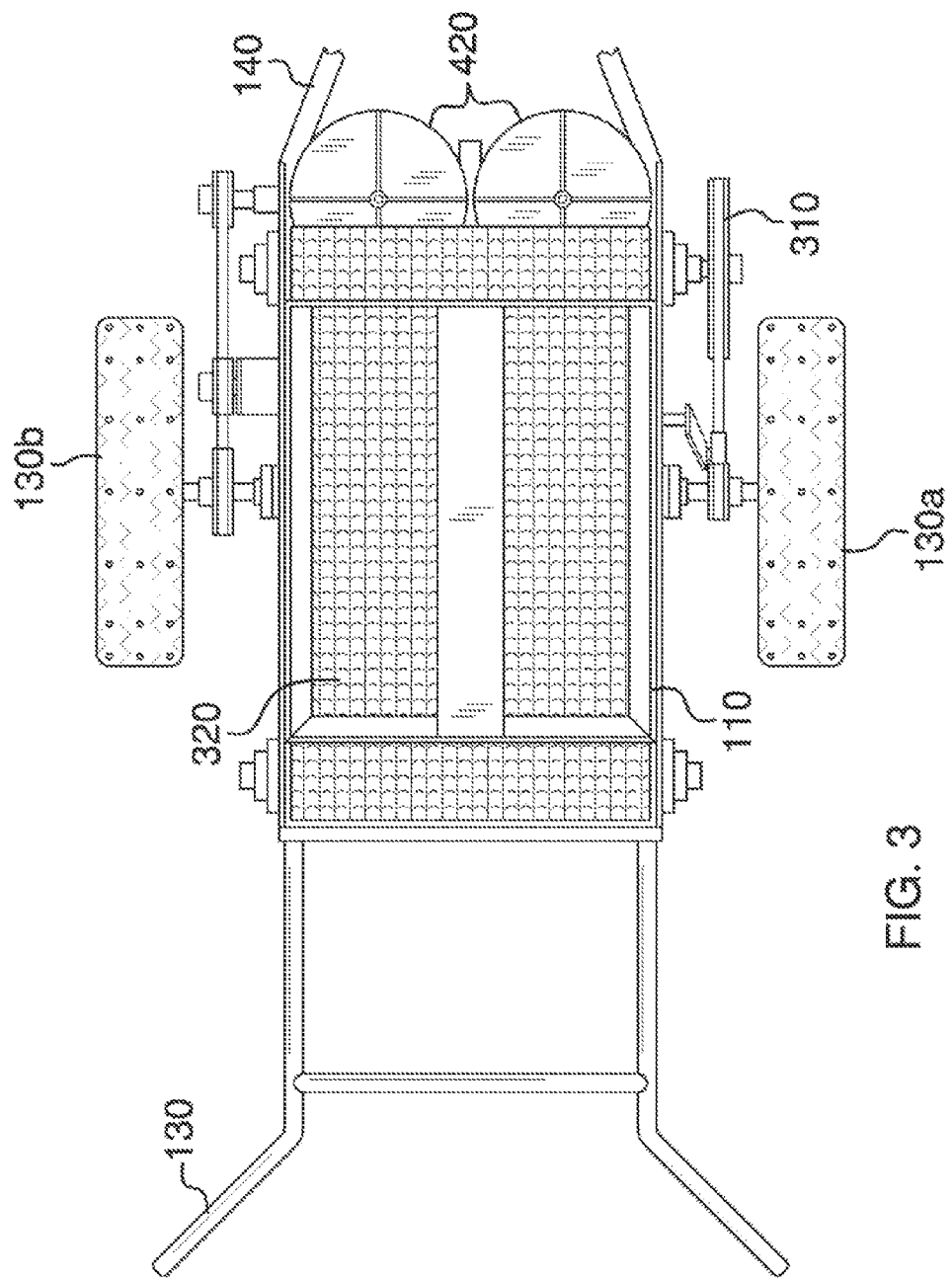
FIG. 3 is a top cross sectional view of the spreader device of FIG. 1 (e.g., hopper not shown).
Figure 4:
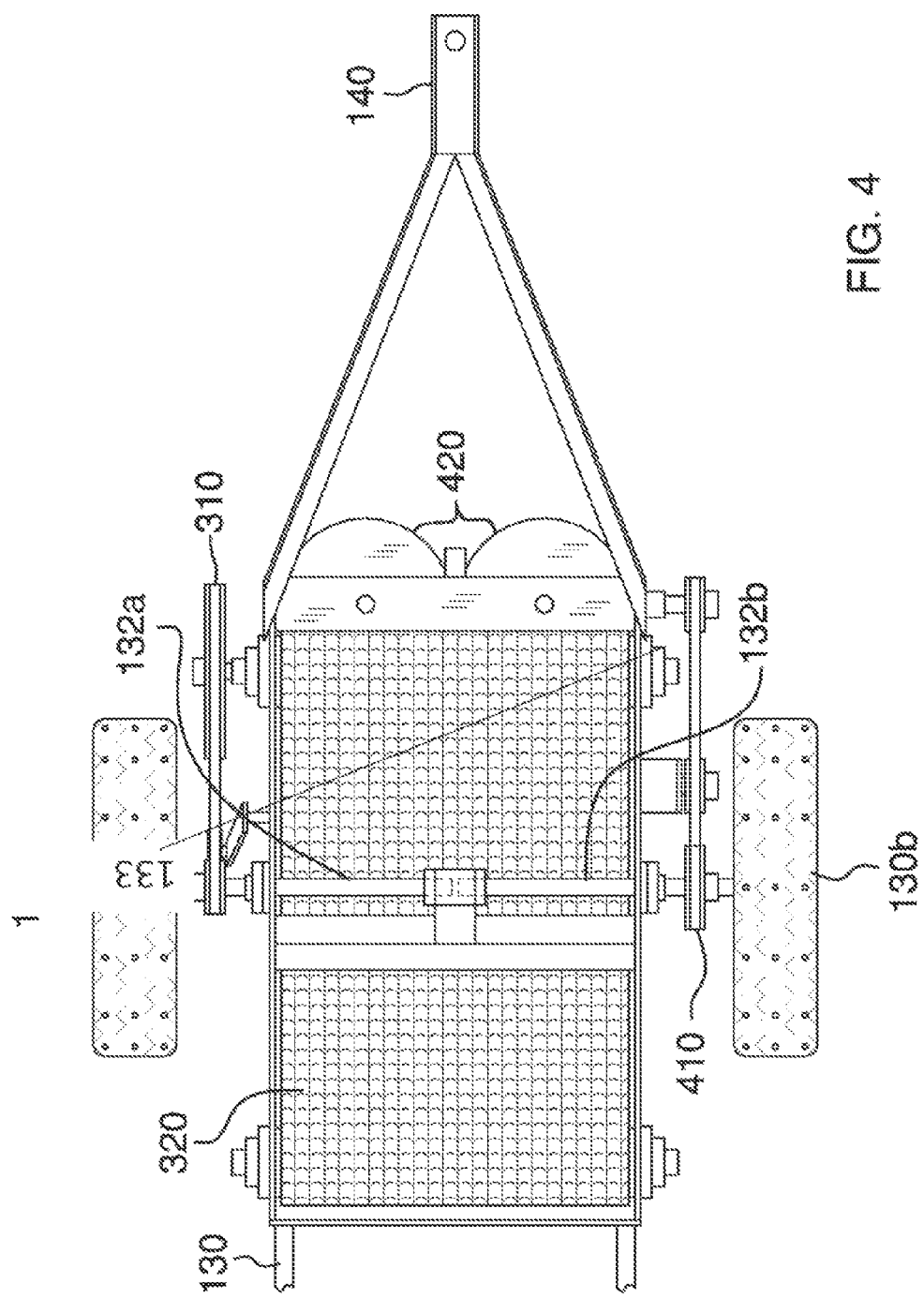
FIG. 4 is a bottom view of the spreader device of FIG. 1.
Figure 5:
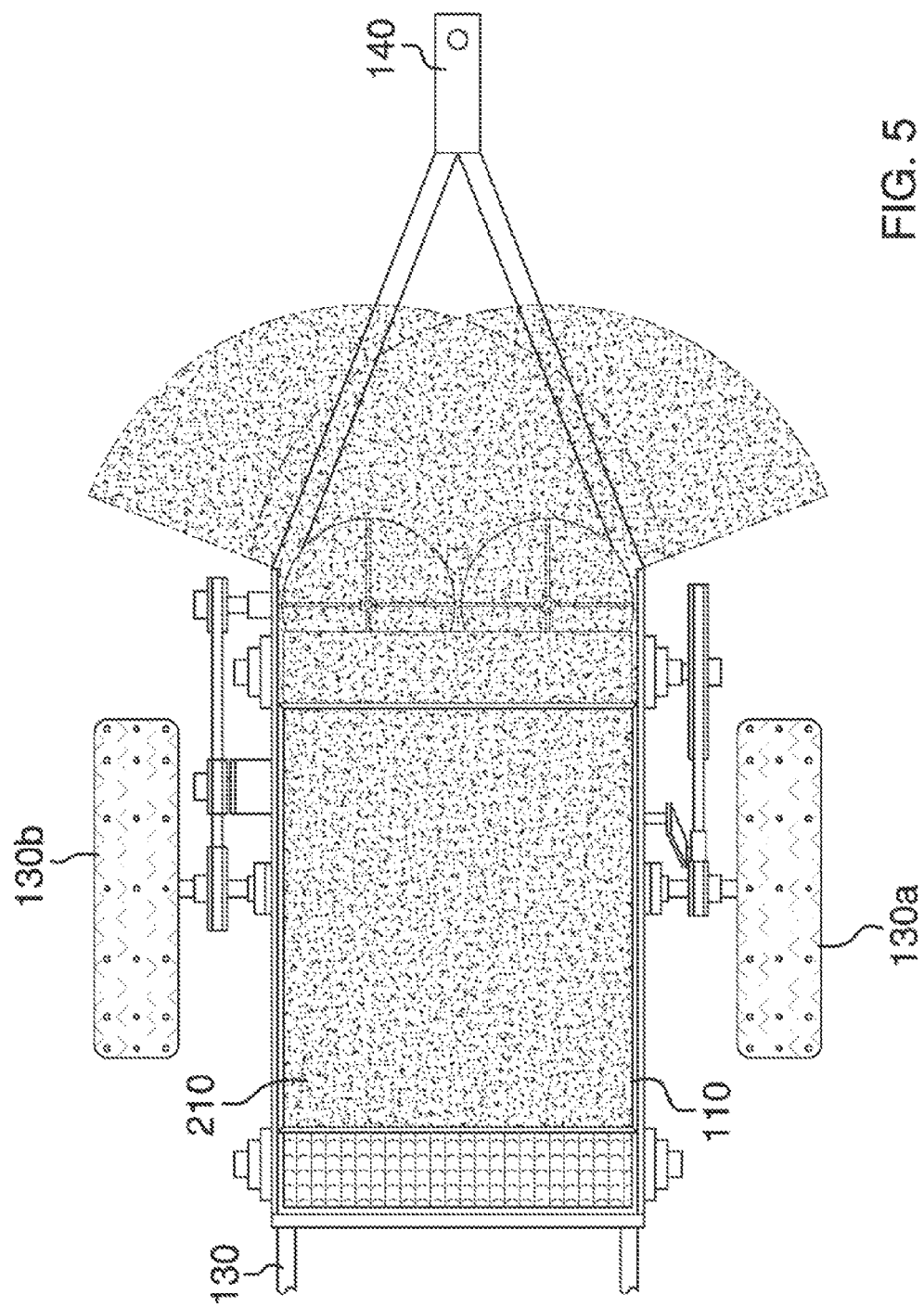
FIG. 5 is a top view of the spreader device of FIG. 1.

Disposed in the frame 110 (e.g., underneath the hopper 210) is a belt drive 310 positioned on a first side of the frame 110 or on a second side of the frame 110 (e.g., internal or external to the frame 110). FIG. 1, FIG. 1A, and FIG. 3 show the belt drive 310 positioned on the first side of the frame 110. A cleated belt 320 rotates over the belt drive 310. The belt drive 310 is operatively connected to (e.g., engages) the first wheel 130a (e.g., the first axle 132a of the first wheel 130a). Rotation of the first wheel 130a engages the belt drive 310 and propels the cleated belt 320 (e.g., in a forward direction). Material atop the cleated belt 320 (from the hopper 210) is propelled forwardly (e.g., toward a metering gate (230)). In some embodiments, the cleated belt 320 and/or belt drive 310 can be activated via a clutch assembly, for example a manual clutch 350 (see FIG. 1A).

Figure 2:
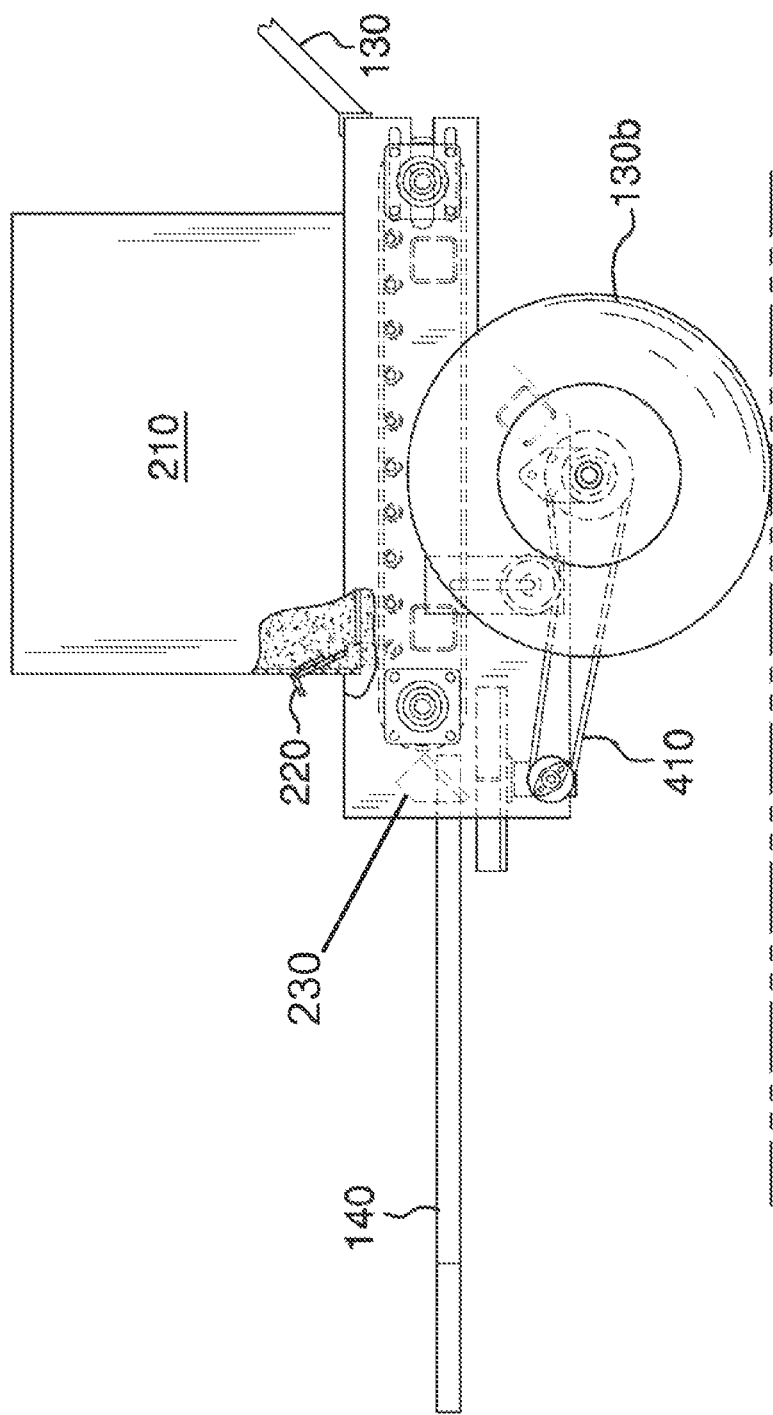
FIG. 2 is a second side and internal view of the spreader device of FIG. 1.

The spreading device 100 further comprises a spinner head drive 410 positioned on a first side of the frame 110 or on a second side of the frame 110 (e.g., internal or external to the frame 110). FIG. 2 and FIG. 3 show the spinner head drive 410 positioned on the second side of the frame 110 opposite the belt drive 310. The spinner head drive 410 is connected to (e.g., engages) the second wheel 130b (e.g., the second axle 132b of the second wheel 130b). The spinner head drive 410 drives a pair of spinner heads 420 positioned in the back of the frame 110 (see FIG. 3). The spinner heads 420 function to help propel and disperse the granular material from the device 100 onto the area below (see FIG. 5). When the second wheel 130*b* (second axle 132*b*) rotates, the cleated belt 320 pushes material from the hopper 210 forwardly to the spinner heads 420, which are rotated via the spinner head drive 410. The spinner heads 420 disperse the material below and around the device 100.

The disclosures of the following U.S. Patents are incorporated in their entirety by reference herein: U.S. Pat. No. 6,907,832; U.S. Pat. No. 5,533,676; U.S. Pat. No. 3,523,648; U.S. Pat. No. 5,340,033; U.S. Pat. No. 7,040,556.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A ground-driven spreader device comprising:
   (a) a split axle divided into a first axle and a second axle, the first axle engages a first wheel and the second axle engages a second wheel;
   (b) a frame mounted atop the split axle, wherein handles are removably attached to a front end of the frame and a trailer hitch is removably attached to a back end of the frame opposite the handles, the handles function to help a user manually push the spreader device forwardly, the trailer hitch is adapted to engage a standard tongue component of a tractor;
   (c) a hopper disposed atop the frame, the hopper comprises an adjustable material gate for controlling release of material from the hopper into the frame;
   (d) a belt drive disposed on a side of the frame underneath the hopper, wherein a cleated belt rotates over the belt drive, the belt drive is operatively connected to the first axle of the first wheel wherein rotation of the first wheel activates the belt drive and causes the cleated belt to propel in a forward direction causing material having fallen from the material gate of the hopper atop the cleated belt to be propelled forwardly toward and through a metering gate disposed in the frame;
   (e) a pair of spinner heads disposed in the back end of the frame; and
   (f) a spinner head drive disposed on a side of the frame opposite the belt drive, the spinner head drive is operatively connected to the second axle of the second wheel, the spinner head drive functions to drive the pair of spinner heads causing the pair of spinner heads to help propel and disperse material from the device, wherein when the second wheel rotates, the material from the cleated belt is pushed to the pair of spinner heads which are rotated via the spinner head drive, the pair of spinner heads disperse the material below the device.

2. The spreader device of claim 1, wherein the cleated belt or the belt drive can be activated via a clutch assembly.

3. The spreader device of claim 1, wherein the first axle and second axle are joined in a split axle bearing housing.

* * * * *